United States Patent
Aiso

(10) Patent No.: US 7,672,538 B2
(45) Date of Patent: Mar. 2, 2010

(54) GENERATION OF STILL IMAGE FROM A PLURALITY OF FRAME IMAGES

(75) Inventor: Seiji Aiso, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1036 days.

(21) Appl. No.: 10/541,479

(22) PCT Filed: Apr. 16, 2004

(86) PCT No.: PCT/JP2004/005514

§ 371 (c)(1),
(2), (4) Date: Jul. 5, 2005

(87) PCT Pub. No.: WO2004/093011

PCT Pub. Date: Oct. 28, 2004

(65) Prior Publication Data

US 2006/0171687 A1    Aug. 3, 2006

(30) Foreign Application Priority Data

Apr. 17, 2003    (JP)    ............................. 2003-112392

(51) Int. Cl.
*G06K 9/36* (2006.01)
*H04N 5/00* (2006.01)
(52) U.S. Cl. ...................... 382/284; 386/120
(58) Field of Classification Search ................. 382/154, 382/284; 386/120
See application file for complete search history.

(56) References Cited

U.S. PATENT DOCUMENTS 5,987,164 A * 11/1999 Szeliski et al. ............. 382/154
6,075,905 A * 6/2000 Herman et al. ............. 382/284
7,376,249 B2 * 5/2008 Beun ......................... 382/107

(Continued)

FOREIGN PATENT DOCUMENTS

EP    1 008 956    6/2000

(Continued)

OTHER PUBLICATIONS

Abstract of Japanese Patent Publication No. 02-010680, Pub. Date: Jan. 16, 1990, Patent Abstracts of Japan.

(Continued)

*Primary Examiner*—Aaron W Carter
(74) *Attorney, Agent, or Firm*—Martine Penilla & Gencarella, LLP

(57) ABSTRACT

Some of a plurality of frame images are made comparison object images for use in synthesizing a still image. Selecting one of the comparison object images as a comparison reference image and one as a target image, the comparison reference image and target image are compared, and a parameter is calculated. If the parameter does not meet a predetermined criterion, the target image is excluded from the comparison object images. Additionally, any number of frame images from among the plurality of frame images are set as comparison object images, and the aforementioned comparison is carried out until the total number of comparison object images and reference images serving as reference for synthesis is equal to or greater than a predetermined number. A synthesized image generating module 75 synthesizes the reference images and comparison object images whose total number is equal to or greater than the predetermined number, to generate a still image.

18 Claims, 14 Drawing Sheets

U.S. PATENT DOCUMENTS

2002/0126913 A1* 9/2002 Kotake et al. ............... 382/282
2005/0013466 A1* 1/2005 Beun ........................ 382/107

FOREIGN PATENT DOCUMENTS

| JP | 02-010680 | 1/1990 |
| JP | 02-010680 U | 1/1990 |
| JP | 06-350974 | 12/1994 |
| JP | 10-069537 | 3/1998 |
| JP | 2000-152250 | 5/2000 |
| JP | 2000-244851 | 9/2000 |
| WO | WO 98/02844 | 1/1998 |
| WO | WO 9802844 A1 * | 1/1998 |

OTHER PUBLICATIONS

Abstract of Japanese Patent Publication No. 06-350974, Pub. Date: Dec. 22, 1994, Patent Abstracts of Japan.

Abstract of Japanese Patent Publication No. 10-069537, Pub. Date: Mar. 10, 1998, Patent Abstracts of Japan.

Abstract of Japanese Patent Publication No. 2000-152250, Pub. Date: May 30, 2000, Patent Abstracts of Japan.

Abstract of Japanese Patent Publication No. 2000-244851, Pub. Date: Sep. 8, 2000, Patent Abstracts of Japan.

S. Mann and R. Picard, "Video Orbits of the Projective Group: A Simple Approach to Featureless Estimation of Parameters," *IEEE Trans. on Image Processing*, vol. 6, No. 9, Sep. 1997, pp. 1281-1295.

* cited by examiner

○ ··· REFERENCE IMAGE PIXEL
● ··· OBJECT IMAGE FOR SYNTHESIS PIXEL

○ ··· REFERENCE IMAGE AND OBJECT IMAGE FOR SYNTHESIS PIXEL

GENERATION OF STILL IMAGE FROM A PLURALITY OF FRAME IMAGES

TECHNICAL FIELD

The present invention relates to a technique for synthesizing a plurality of frame images included in video to create a still image.

BACKGROUND ART

Conventionally a still image is created by capturing a single scene from video shot with a digital video camera or the like so that the still image has higher resolution than the frame images. Such a still image is created through a synthesis process that involves overlapping several frames contained in the video image.

For example, JP2000-244851A discloses a technique wherein a single frame image is selected as a reference image from among a number (n+1) of successive images, motion vectors for the other n frame images (processing-object-images) with respect to this reference image are calculated. and on the basis of the motion vectors, the (n+1) frame images are synthesized to produce a still image.

JP06-350974A discloses another technique for created a still image from interlacing video images, wherein one field is selected as a reference image from among a pair of interlacing fields, with the other filed being selected as a processing-object-image, then determining on a field-by-field basis whether the processing-object-image is suitable for synthesis, synthesizing them where determined to be appropriate. Typically, by increasing the number of frame images to be synthesized, it is possible to improve picture quality of the still image; however, it is not always the case that picture quality is improved by increasing the number of frame images to be synthesized. The reasons for this are described hereinbelow.

FIG. 1 is an illustration of a method for synthesizing a reference image and an object image for synthesis. At top in FIG. 1 are shown a reference image and an object image for synthesis, positioned so as to compensate for image shift. At bottom in FIG. 1 are shown positional relationships among pixels of the reference image, object image for synthesis, and synthesized image. At bottom in FIG. 1, "○" symbols denote pixels of the reference image. "•" symbols denote pixels of the object image for synthesis. The hatched circles shown on the broken gridlines denote pixels of the synthesized image. In this drawing, resolution of the reference image and object image for synthesis are shown as being the same, with frame image resolution being increased by 1.5× in the x axis direction and y axis direction.

Here, pixel g1 of the synthesized image will be considered. This pixel g1 coincides with pixel t1 of the reference image. Here, on the basis of tone values of the four pixels s1-s4 of the object image for synthesis surrounding pixel g1, a tone value at the position of pixel g1 is calculated by a bilinear method, and this tone value is then averaged with the tone value of pixel t1 of the reference image to obtain a tone value for pixel g1.

A tone value for pixel g2 of the synthesized image is determined by the following procedure. On the basis of tone values of the four pixels t2-t5 of the reference image surrounding pixel g2, a tone value at the position of pixel g2 is calculated by a bilinear method. Next, on the basis of tone values of the four pixels s4-s7 of the object image for synthesis surrounding pixel g2, a tone value at the position of pixel g2 is calculated by a bilinear method. The two are then averaged to obtain a tone value for pixel g2.

Tone values for other pixels can be determined in the manner described above. Here, in order to facilitate understanding, the description assumes that resolution of the reference image and processing-object-image is the same; however, where reference image and processing-object-image resolutions are different, a similar process may be carried out after enlargement or reduction, as appropriate.

FIG. 2 is an illustration showing a synthesis method for use where there is zero image shift between a reference image and an object image for synthesis. At top in FIG. 2 are shown a reference image and an object image for synthesis, positioned so as to correct for shift. In this case, since shift is zero, the reference image and object image for synthesis overlap completely. At bottom in FIG. 2 are shown positional relationships among pixels of the reference image, object image for synthesis, and synthesized image. Since the reference image and object image for synthesis overlap in their entirety, the pixels of the reference image and those of the object image for synthesis are situated at the same locations.

A tone value for pixel g2 of the synthesized image is determined by the following procedure. First, on the basis of tone values of the four pixels t2-t5 of the reference image surrounding pixel g2, a tone value at the position of pixel g2 is calculated by a bilinear method. Next, on the basis of tone values of the four pixels s2-s5 of the object image for synthesis surrounding pixel g2, a tone value at the position of pixel g2 is calculated by a bilinear method. The two are then averaged to obtain a tone value for pixel g2.

Since tone values of pixels t2-t5 and tone values of pixels s2-s5 are the same values, the tone value at the position of pixel g2 calculated by bilinear method on the basis of pixels t2-t5 and the tone value at the position of pixel g2 calculated by bilinear method on the basis of pixels s2-s5 are identical values. That is, the average value thereof will also be the same as tone value at the position of pixel g2 calculated by bilinear method on the basis of pixels t2-t5, and tone value at the position of image g2 calculated by bilinear method on the basis of pixels s2-s5.

That is, where there is zero shift between a reference image and an object image for synthesis, carrying out the synthesis process will give a synthesis result that is no different from the original image. Similarly, where there is only a slight shift amount, there will be substantially no noticeable difference between the image resulting from synthesis and the original image. In such instances, the synthesis only increases the processing time, with no hope of substantial improvement in picture quality.

DISCLOSURE OF THE INVENTION

With the foregoing problem in view, it is an object of the present invention to efficiently improve the picture quality of a still image in instances where a still image is being created from a plurality of frame images included in a video image.

To address the above problem at least in part, the image generating device of the invention is an image generating device for generating a still image from a plurality of frame images contained in a video image, characterized by comprising: a synthesis object setting module for setting, from among areas included in frame images other than a reference frame image selected from among the plurality of frame images, one or more areas as object frame image areas for synthesis, the object frame image areas being selected according to a predetermined rule relating to a reference frame image area within the reference frame image; a comparison reference extracting module for extracting one comparison reference frame image area from among the reference frame image area and the object frame image areas for synthesis; a target extracting module for extracting one target frame image area from among the object frame image areas for synthesis other than the comparison reference frame image area; a comparing module for comparing the comparison reference frame image area with the selected target frame image area to calculate a pre-selected parameter; an excluding module that in the event that the parameter does not meet a predetermined criterion, excludes the target frame image area from the object frame image areas for synthesis; and a synthesized image generating module for synthesizing the reference frame image area and object frame image areas for synthesis to create a synthesized image area.

Here, frame image refers to a still image displayable in progressive format (also known as non-interlaced format). Accordingly, in interlaced format, the frame image of the invention would correspond to an image composed of a number of field images (odd-numbered fields and even-numbered fields) with different raster lines.

According to an aspect of the present invention, a frame image area not meeting a predetermined criterion is excluded as an object of synthesis, and the number of frame image areas to be synthesized is maintained at or above a predetermined number, whereby picture quality of the synthesized image can be improved efficiently. Herein, where the parameter calculated by the comparing module is image shift, for example, the predetermined criterion may be whether image shift is above a threshold value. A more detailed description will be made later. The predetermined number of frame image areas can be set arbitrarily, but in preferred practice will be 2 or greater.

The synthesis object setting module may set areas of plural frame images that succeed in a time series immediately after the reference frame image in the video, as the object frame image areas for synthesis, or set the object frame image areas for synthesis at an interval of several frames.

As the image synthesis process performed by the synthesized image generating module there may be employed a nearest neighbor method, bilinear method, bi-cubic method, or any other of various known methods for image interpolation. Typically, methods enabling processing at higher speeds involve simpler procedures, and thus have poorer interpolation accuracy and picture quality than do methods involving more complicated procedures. For example, the nearest neighbor method, bilinear method, and bi-cubic method are increasingly complex in that order, and have correspondingly longer processing times. On the other hand, interpolation accuracy is high and picture quality is improved.

In the event that there is a large total number of the object frame image areas for synthesis and the reference frame image area, the synthesized image generating module may perform a fast synthesis process by means of the nearest neighbor method or the like; or in the event of a smaller number it may carry out a synthesis process with a high degree of interpolation accuracy by means of the bi-cubic method or the like.

The synthesized image generating module may additionally comprise a setting module for setting as the reference frame image area an area within the reference frame image, to serve as a reference for synthesis; and a frame number controlling module for repeating the processes of the synthesis object setting module, the comparison reference extracting module, the object extracting module, the comparing module and the excluding module, until the total number of the reference frame image area and the object frame image areas for synthesis meeting the criterion reaches a predetermined number or greater.

The image generating device of the invention may comprise a specification receiving module for receiving specification of the reference frame image, with the setting module setting the specified frame image as the reference frame image.

By so doing, the user will be able to select from a video a frame image from which to make a still image, and to designate it as the reference frame image.

In the image generating device herein, the comparison reference extracting module may set the reference frame image area as the comparison reference frame image area.

Since the reference frame image area is an area of the image that will serve as reference for synthesis, it is preferable in the first instance to use the reference frame image area as the comparison reference frame image area. Using the reference frame image area as the comparison reference frame image area, it may be decided whether an object frame image area for synthesis qualifies for synthesis, and one area selected from object frame image areas for synthesis that have been qualified for synthesis can be used as the next comparison reference frame image area.

For example, using frame image areas 1, 2, 3, let it be assumed that frame image area 1 is the reference frame image area, and frame image area 2 and frame image area 3 are object frame image areas for synthesis. First, using frame image area 1 as the comparison reference frame image area, the shift amount of frame image area 2 and the shift amount of frame image area 3 are calculated. If each shift amount calculated in this manner is equal to or greater than a predetermined value, frame image area 2 is then used as the comparison reference frame image area.

Even where the shift amount of frame image area 2 relative to frame image area 1 and the shift amount of frame image area 3 relative to frame image area are each equal to or greater than a predetermined value, if the shift amount of frame image area 3 relative to frame image area 2 is zero, there will be no need to synthesize all of the frame image areas 1, 2, 3. That is, it will be sufficient simply to synthesize frame image areas 1 and 2, or frame image areas 1 and 3. By using frame image area 2 as the comparison reference frame image area and frame image area 3 as an object frame image area, it is possible to exclude frame image area 3 as an object of synthesis.

The image generating device herein may comprise an eliminating module for eliminating, from among the object frame image areas for synthesis, an area of a frame image for which a characteristic of the frame image area meets a predetermined condition.

The predetermined condition may be, for example, a high level noise, out-of-focus, abnormal color tone due to a hand covering the lens, or the like. The eliminating module is able in advance to eliminate such frame image areas from synthesis objects.

In the image generating device herein, the parameter may be an image shift amount.

The image shift amount is due, for example, to shaking or turning of the camera. If the image shift amount is too small, the object frame image area for synthesis will be substantially unable to raise picture quality of a synthesized image area. In the present invention, object frame image areas for synthesis that are not very useful in terms of improving picture quality of a synthesized image area can be excluded as synthesis targets. The image shift amount may include at least either an amount of translational shift or an amount of rotational shift.

Translational shift can be detected by any of various methods such as a block matching or gradient-based method, or a method which is a combination of these. Rotational shift can be detected by means of geometric calculations. Where the parameter is an image shift amount, the predetermined criterion mentioned earlier may be whether the image shift amount exceeds a threshold value.

In the image generating device herein, the comparing module may comprise a frame shift calculating module for calculating the image shift amount of a target frame image containing the target frame image area, with respect to a comparison reference frame image containing the comparison reference frame image area; and an area shift calculating module for calculating the image shift amount of the target frame image area with respect to the comparison reference frame image area, on the basis of the image shift amount calculated by the frame shift calculating module.

According to an aspect of the invention, the shift amount of an area can be calculated easily from the image shift amount of a frame image. In some instances shift amount of individual areas can be approximated by translational shift. Even an image that, taken as a frame image as a whole, is not qualified for synthesis, may be useable for synthesis if divided into areas. The amount of area shift can be calculated directly, without calculating the image shift amount of the frame image.

In the image generating device herein, the parameter may be an image difference derived from a comparison of pixel characteristic values at identical locations in the target frame image area and the comparison reference frame image area.

This characteristic value may be color tone or luminance. In the present invention, through comparison with a comparison reference frame image area, it is possible to exclude as synthesis objects frame image areas having substantially no image difference. Since synthesizing together frame image areas of the same content simply gives a frame image area also having the same content, picture quality will not be improved; therefore, frame image areas having the same content as the comparison reference frame image area may be deliberately excluded from the object frame image area for synthesis.

The invention is particularly effective in cases where the frame rate in video has been varied, or other such instances where there is a sequence of frames having identical content, in order to exclude as synthesis object frame image areas having identical content. In such instances, it is possible to determine whether a frame image area qualifies for synthesis simply by determining whether there is a substantial image difference, without having to calculate the shift amount. Since it is sufficient to merely calculate an image difference, the procedure is simple. Where the parameter is an image difference, the predetermined criterion mentioned earlier may be whether the image difference is not zero.

In the image generating device herein, the parameter may be a correlation of average values of pixel characteristic values in the object frame image area and in the comparison reference frame image area.

According to an aspect of the invention, through comparison with a comparison reference frame image area, it is possible to exclude as synthesis object frame image areas that differ in characteristics. If a frame image area that is clearly abnormal in comparison to the comparison reference frame image area is used in synthesis, the synthesized frame image will also assume abnormal picture quality, and thus frame image areas that are clearly abnormal are deliberately excluded from the object frame image area for synthesis.

This approach may be particularly effective, for example, in an instance where a dark-toned frame image area is excluded as synthesis object when synthesizing a still image area of a bright-toned scene. In such instances, it is possible to determine whether a frame image area qualifies for synthesis simply by calculating the difference in an average of characteristic values, without having to calculate the shift amount. Since it is sufficient to merely calculate the difference in an average of the characteristic values, the procedure is simple. Where the parameter is a comparison of difference in average of characteristic values of pixels, the predetermined criterion mentioned earlier may be whether comparison of average of the characteristic values of pixels is large.

In the image generating device herein, the reference frame image area and the object frame image area for synthesis may be areas derived by dividing each the frame image in an identical manner; and the target extracting module may extract a target frame image area at a same location corresponding to the comparison reference frame image area.

According to the present invention, the determination as to whether to make an area an object of synthesis can be carried out on an area-by-area basis for areas of frame images divided into identical shapes. By making determination on an area-by-area basis, even frame images that have been uniformly excluded from targets for synthesis may, in certain areas thereof, be designated as objects for synthesis. As a result, picture quality of the synthesized image can be improved.

In addition to the image generating device aspect described hereinabove, the present invention in another aspect thereof may take the form of an image generating method invention. The invention may also be realized in various other aspects, for example, a computer program or a recording medium having such a computer program recorded thereon. The various additional elements described hereinabove may be implemented in any of these aspects.

Where the invention is provided as a computer program or a recording medium having such a computer program recorded thereon, it may be provided as an entire program for controlling operation of an image generating device, or as an arrangement of modules for carrying out the functions of the invention only. As recording media, there could be employed any of various kinds of computer-readable media, such as a flexible disk, CD-ROM, DVD-ROM, magneto-optical disk, IC card, ROM cartridge, punch card, printed matter having a bar code or other symbols imprinted thereon, a computer internal storage device (RAM, ROM or other such memory), or an external storage device.

BEST MODE FOR CARRYING OUT THE INVENTION

The embodiments of the invention are described hereinbelow through in the following order.

A. Embodiment 1
   A1. Arrangement of Image Generating Device:
   A2. Generation of Still Image:
   A3. Detection of Shift:
   A4: Still Image Generation Process:

B. Embodiment 2
   B1. Arrangement of Image Generating Device:
   B2. Detection of Block Shift:
   B3: Still Image Generation Process:

C. Variations

A. Embodiment 1

A1. Arrangement of Image Generating Device

Figure 1:
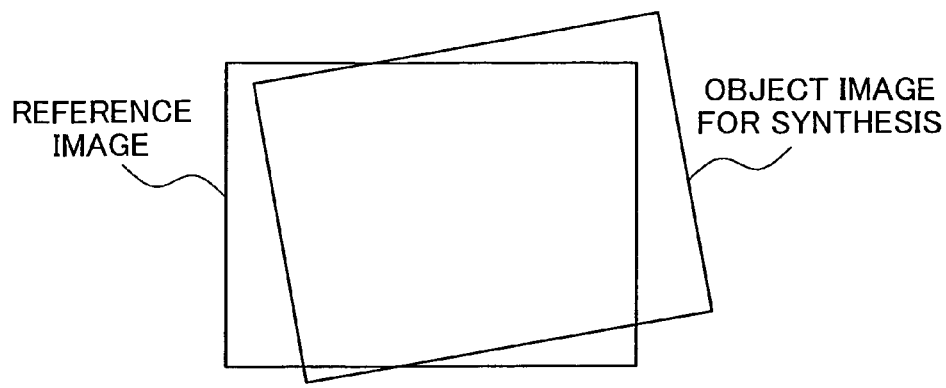
FIG. 1 is an illustration of a method for synthesizing a reference image and an object image for synthesis.
Figure 1:
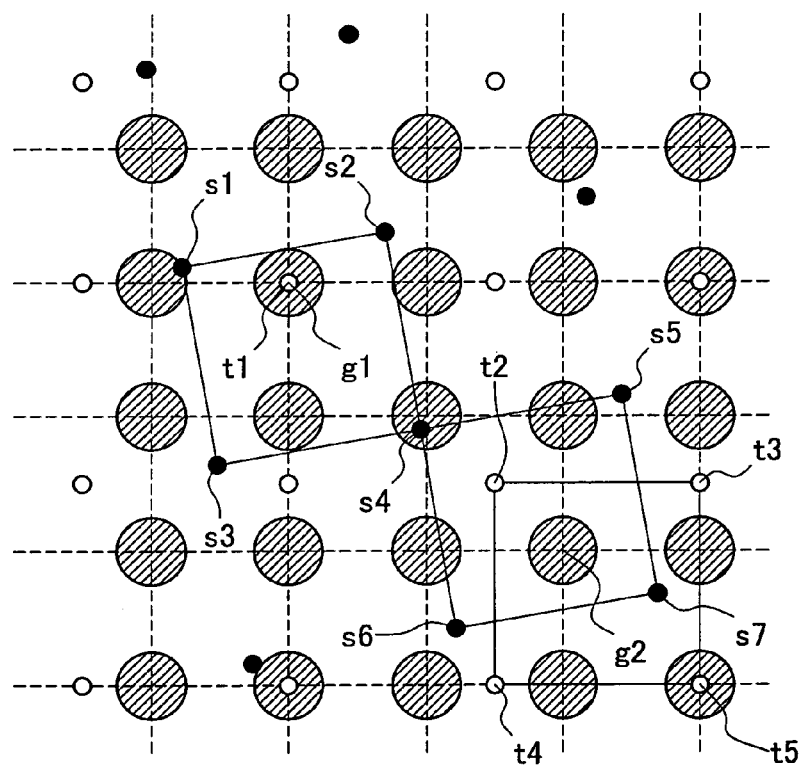
Figure 2:
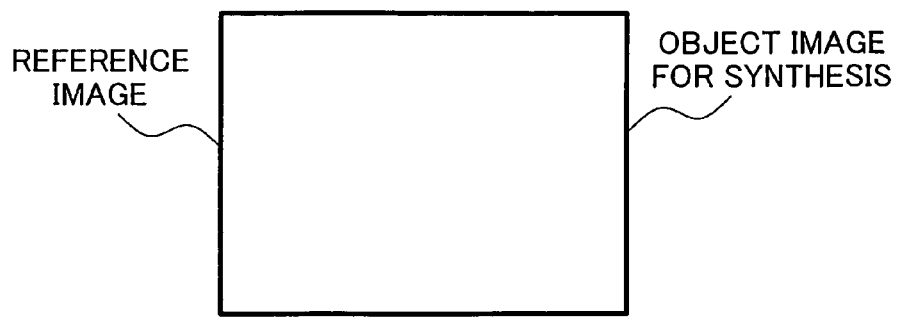
FIG. 2 is an illustration showing a synthesis method for use in a case of zero shift between a reference image and an object image for synthesis.
Figure 2:
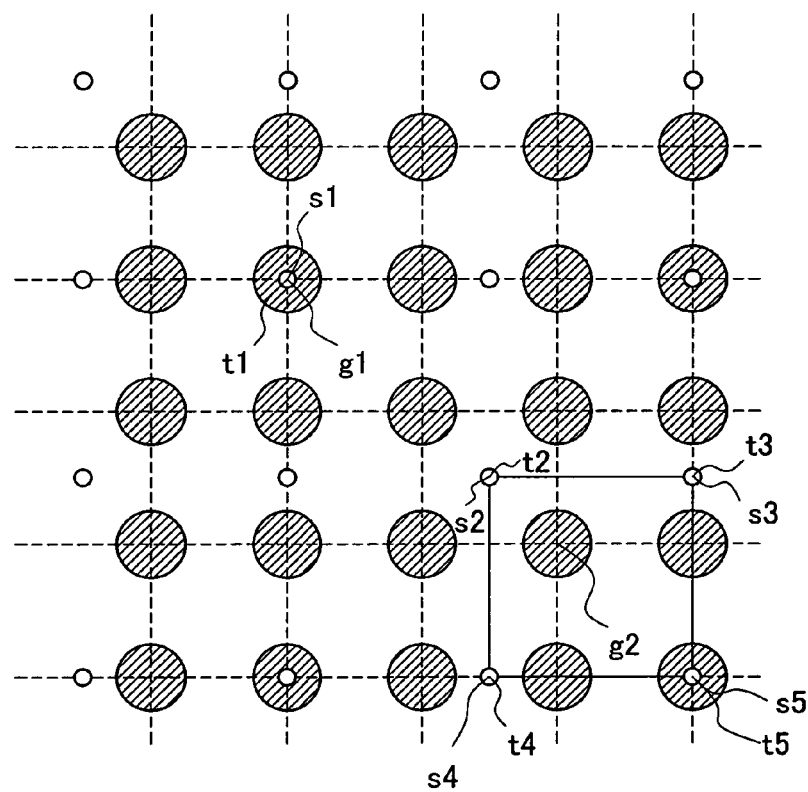
Figure 3:
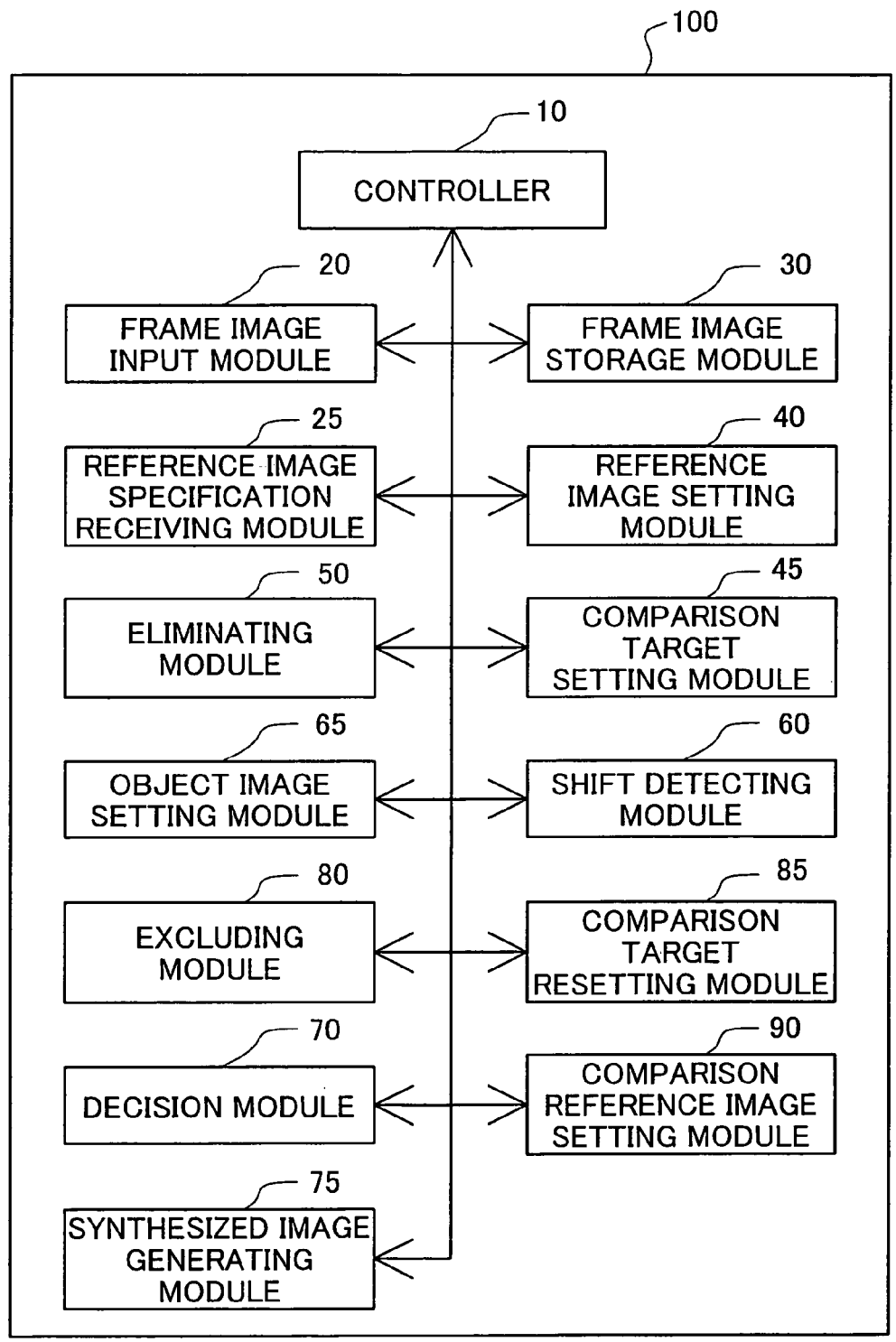
FIG. 3 is an illustration of a simplified arrangement of an image generating device 100 as Embodiment 1 of the invention.

FIG. 3 is an illustration of a simplified arrangement of an image generating device 100 as Embodiment 1 of the invention. This image generating device 100 is a device that synthesizes plurality of frame images contained in a video, to create a still image of higher resolution than the frame images. Image generating device 100 is composed of predetermined application software installed on a general-purpose personal computer; the illustrated functional blocks are implemented by means of software.

The personal computer comprises a CPU, ROM, and RAM, as well as a hard disk and an interface for input of motion video from a DVD-ROM, memory card, or other recording medium. A function for playback of input video is provided as well.

Controller 10 carries out control of the other modules. A frame image input module 20 inputs or obtains frame images contained in the video. In this Embodiment, once a user inputs a Pause instruction during video playback, frame image input module 20 inputs four successive frame images in a time series starting at input timing. Here, the number of frame images input is the number of frame images to be used to synthesize a still image.

While inputting four frame images, frame image input module 20 also inputs 20 frame images succeeding these in the time series, and stores them separately in a frame image storage module 30. These 20 frame images serve as backup frame images for use as candidates for new synthesis in the event that the preceding four frame images are unsuitable for synthesizing a still image. Hereinafter these 20 frame images will be referred to as "backup frame images." The preceding 4 frame images will be referred to as "selected frame images." The frame image input module 20 may perform a process to convert backup frame images into selected frame images.

An arrangement whereby the number of frame images input by frame image input module 20 may be set by the user is acceptable as well. Input frame images need not be sequential in a time series. Frame images may be input at the timings of input instructions to the command input module so that the input images constitute the second frame image, the third frame image, and so on in a time series.

The frame image storage module 30 stores a plurality of frame images input from the frame image input module 20. From among the selected frame images stored in the frame image storage module 30, an eliminating module 50 eliminates those frame images that are deemed abnormal when each frame image is evaluated. For example, frame images with high noise, out-of-focus frame images, or selected frame images with abnormal color tone due to a hand covering the lens or the like are eliminated.

Where a selected frame image has been excluded, the frame image input module 20 converts a backup frame image to a new selected frame image. The converted backup frame image will be the backup frame image that succeeds the previous selected frame image in the time series. The eliminating module 50 examines the image newly set as the selected frame image, and excludes any abnormal selected frame image. The process of excluding a selected frame image and converting a backup frame image into a new selected frame image is repeated until the number of selected frame images determined by the eliminating module 50 to be normal finally reaches four.

A reference image specification receiving module 25 displays the selected frame images on the monitor. The user can then specify, from among the displayed selected frame images, a frame image to serve as a reference image. The reference image specification receiving module 25 receives this specification. A reference image setting module 40 sets the selected frame image received by the reference image specification receiving module 25 as the reference image.

Alternatively, rather than providing a reference image specification receiving module 25, the first selected frame image input by the frame image input module 20 may be designated as the reference image. Within the image generating device 100 there may also be provided a functional block for carrying out analysis of a characteristic value (for example, edge amount) for each selected frame image, and setting a reference image on the basis of the analysis.

From among the selected frame images, a comparison target setting module 45 sets the selected frame images other than the reference image as comparison subject images. A comparison reference image setting module 90 sets the reference image or one of the comparison target images as a comparison reference image. Initially, the reference image is set as the comparison reference image. A comparison target resetting module 85 updates the comparison target images by excluding the comparison reference image from the comparison target images. An object image setting module 65 sets one of the comparison target images as a processing-object-image, by way of a target for detecting the shift amount from the comparison reference image. In this Embodiment, as will be described later, comparison target images are set as processing-object-images in the order in which they were input or converted by the frame image input module 20.

A shift detecting module 60 detects the shift amount of a processing-object-image with respect to the reference image. In this Embodiment, the amount of translational shift is detected. Detection of shift will be described later. An excluding module 80 excludes a processing-object-image from the comparison target images if the shift amount detected by shift detecting module 60 does not meet a predetermined criterion.

A decision module 70 decides whether the comparison reference image and comparison target images total four. In the event there are four, a synthesized image generating module 75 carries out resolution conversion, and while correcting for the shift amount detected by the shift detecting module 60 synthesizes the reference image and comparison target images to generate the synthesized image. The reference image serves as a basis of the criterion during synthesis; the synthesis method is as described previously. However, since four images are being synthesized, the average of four tone values is calculated for each pixel of the synthesized image. In the event that there are not four images, the frame image input module will again convert a backup frame image to a selected frame image.

A2. Generation of Still Image

Figure 4:
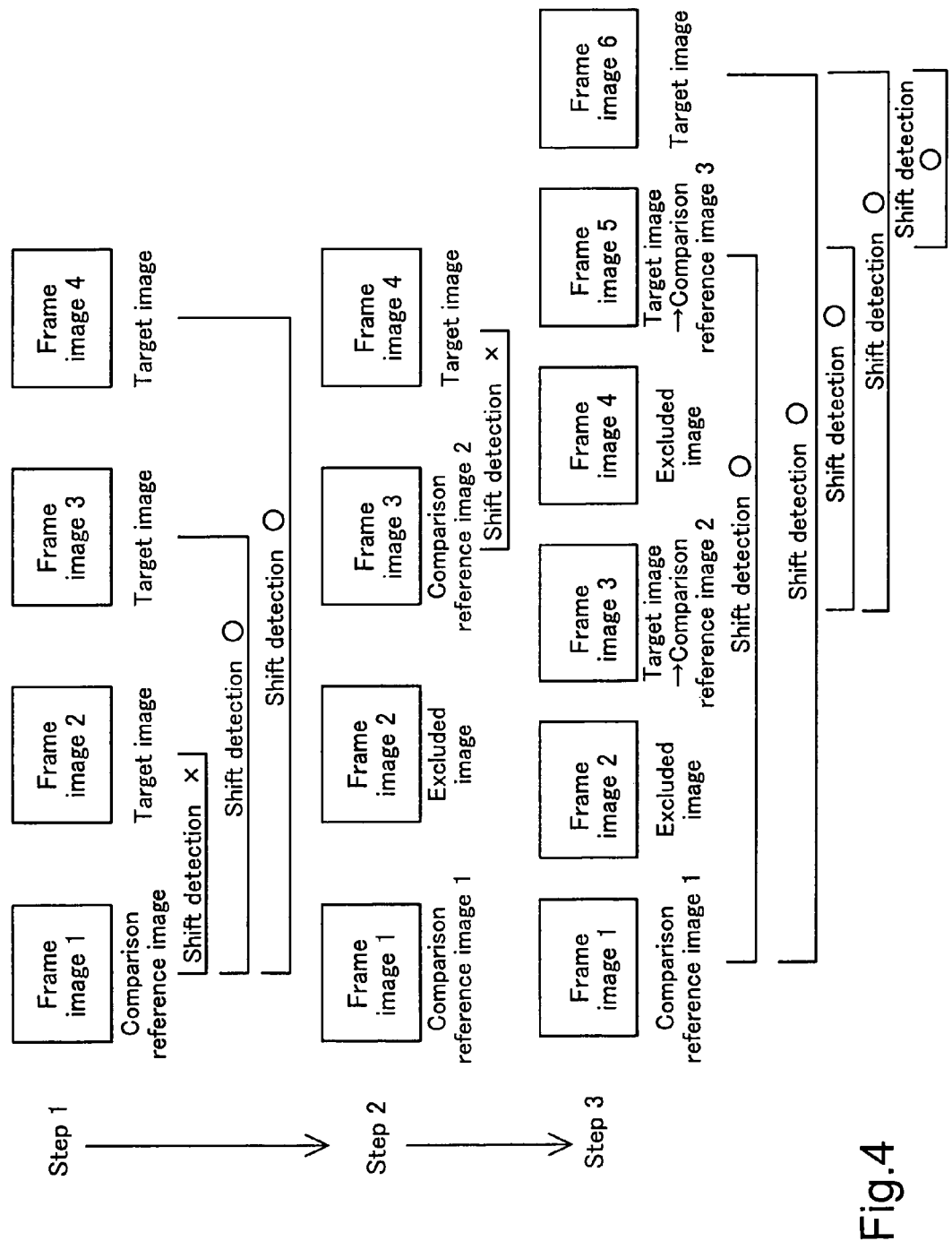
FIG. 4 is a conceptual illustration showing a plurality of frame images being synthesized to create a still image in Embodiment 1.

FIG. 4 is a conceptual illustration showing a plurality of frame images being synthesized to create a still image in Embodiment 1. As described previously, in this Embodiment successive frame images in a time series are used to generate a still image. The lead frame image 1 is the reference image set by the reference image setting module 40, and frame image 2 to frame image 4 are comparison target images set by comparison target setting module 45. None of these frame images were eliminated by the eliminating module 50.

Step 1 is now described. The comparison reference image setting module 90 first sets the reference image, namely frame image 1, as the comparison reference image. The comparison target resetting module 85 resets the residual comparison target images other than the comparison reference image, i.e. frame image 2 to frame image 4, to the comparison target images. From among the comparison target images, the object image setting module 65 first selects frame image 2 as the processing-object-image. The shift detecting module 60 detects the shift amount between the comparison reference image (frame image 1) and the processing-object-image (frame image 2). The excluding module 80 then determines whether the shift amount meets a predetermined criterion. Here, it does not meet the predetermined criterion, and is accordingly shown with a mark "x". That is, frame image 2 is excluded from the comparison target images by the excluding module 80.

Next, the object image setting module 65 sets the frame image 3 as the processing-object-image. The shift amount between the comparison reference image (frame image 1) and the processing-object-image (frame image 3) is detected, and determination is made as to whether the shift amount meets the predetermined criterion. Here, frame image 3 meets the predetermined criterion and is accordingly shown with a mark "o". That is, frame image 3 is not excluded from the comparison target images by the excluding module 80. Next, frame image 4 is selected as the processing-object-image, and the shift amount between the comparison reference image (frame image 1) and the processing-object-image (frame image 4) is detected. Since the shift amount meets the predetermined criterion it is accordingly shown with a mark "o".

Step 2 is now described. Step 2 is the next process carried out after Step 1. First, from among the comparison target images not excluded by the excluding module 80 (frame image 3 and frame image 4), the comparison reference image setting module 90 establishes one of these (frame image 3) as the comparison reference image. Since the reference image (frame image 1) was previously served as the comparison reference image in Step 1, it is not used here as the comparison reference image. In order to distinguish between them, the previous frame image 1 will be termed "comparison reference image 1", and frame image 3 termed "comparison reference image 2."

The comparison target resetting module 85 then newly sets the residual comparison target images (frame image 4) other than the comparison reference image (frame image 3) to the comparison target image(s). Here, while there is one new comparison target image, in some instances there may be several instead.

The object image setting module 65 sets one of the comparison target image(s) as the processing-object-image. Inevitably, frame image 4 will be the processing-object-image. The shift detecting module 60 detects the shift amount between the comparison reference image 2 (frame image 3) and the processing-object-image (frame image 4). The excluding module 80 then determines whether the shift amount meets the predetermined criterion. Here, frame image 4 does not meet the predetermined criterion, and is accordingly shown with an "x". That is, frame image 4 is excluded from the comparison target image(s) by the excluding module 80.

Next, the decision module 70 decides whether the comparison reference images and the comparison target images total four. The decision module 70 carries out the decision when after shift detection the number of comparison target image reaches one or fewer. Since there are two comparison reference images, namely frame image 1 and frame image 3, and no comparison target images, the total is 2. Since this number is not 4, the frame image input module 20 converts backup frame images to selected frame images so that the total number of frame images is 4. That is, two backup frame images are converted to selected frame images. Of the two, if even one is eliminated by the eliminating module 50, conversion of a frame image is performed again.

The frame images newly input in this manner are frame image 5 and frame image 6 shown in Step 3. Step 3 is now described. Step 3 is the next process carried out after Step 2. First, the comparison target image setting module 45 sets frame image 5 and frame image 6 as comparison target images. The comparison reference image setting module 90 sets frame image 1 as the comparison reference image 1, while the comparison target resetting module 85 sets frame image 3, frame image 5, and frame image 6 as the comparison target images.

Each of Frame image 3, frame image 5, and frame image 6 is then selected in that order as the processing-object-image, for detecting the shift amount. For each of frame image 3, frame image 5, and frame image 6 the shift amount meets the predetermined criterion, and is accordingly shown with a mark "o". Since the results of shift detection for frame image 1 and frame image 3 are shown in Step 1, these are omitted from the illustration in Step 3.

Next, one (frame image 3) of the comparison target images (frame image 3, frame image 5, frame image 6) is selected as the comparison reference image 2, with the remaining comparison target images (frame image 5, frame image 6) being set as comparison target images. Each of frame image 5 and frame image 6 is then selected in that order as the processing-object-image, for detecting the shift amount. For both frame image 5 and frame image 6 the shift amount meets the predetermined criterion, and is accordingly shown with a "o".

Then, one (frame image 5) of the comparison target images (frame image 5, frame image 6) is set as the comparison reference image 3, with the remaining comparison target image (frame image 6) being set as the comparison target image. Frame image 6 is then set as the processing-object-image, for detecting the shift amount. The shift amount of frame image 6 meets the predetermined criterion, and is accordingly shown with a mark "o".

At this point, since the number of comparison target images after shift detection has reached one or fewer (frame image 6 only), the decision module 70 carries out the decision. The comparison reference images number is three (frame image 1, frame image 3, frame image 5), and the comparison target images number is one (frame image 6); the total makes four. Since the total number of comparison reference images and comparison target images has reached four, synthesized image generating module 75 performs resolution conversion, and while compensating the shift amount detected by the shift detecting module 60, synthesizes the comparison reference images and comparison target images to generate the synthesized image. A description of detection of the shift amount between a comparison reference image and a processing-object-image follows.

A3. Detection of Shift

Figure 5:
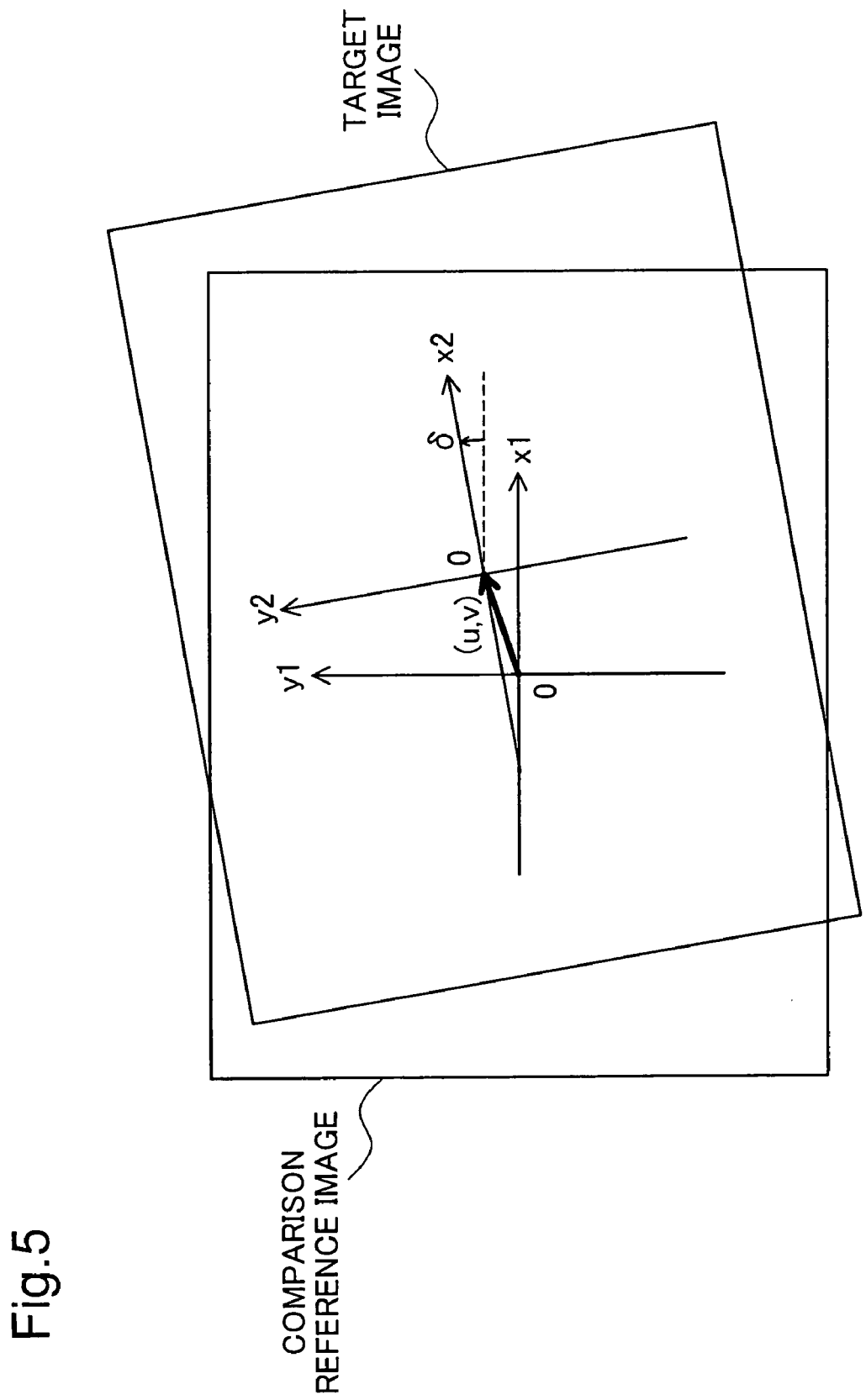
FIG. 5 is an illustration of the shift amount between a comparison reference image and a processing-object-image.

FIG. 5 is an illustration of the shift amount between a comparison reference image and a processing-object-image. It is assumed that the comparison reference image coordinates (x1, y1) are shifted away from the processing-object-image coordinates (x2, y2). Here, the extent of translational shift (u, v) and of rotational shift δ are used as the shift amount.

Figure 6A:
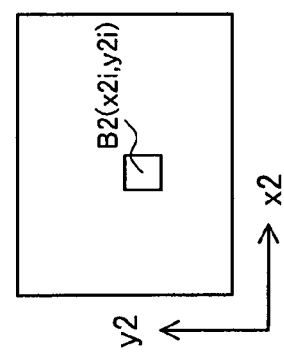
FIGS. 6(a) and 6(b) illustrate a method for calculating translational shift by means of the gradient-based method.
Figure 6A:
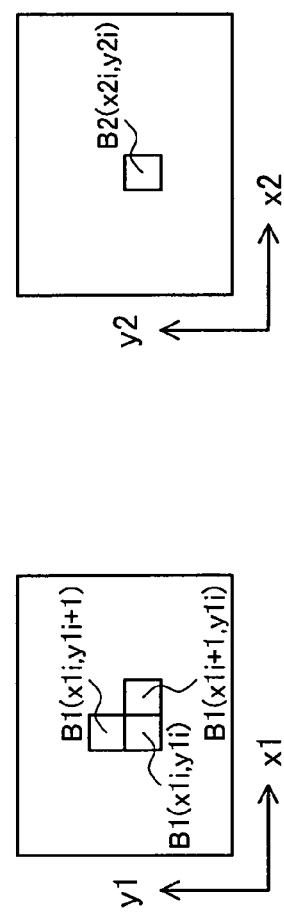
Figure 6B:
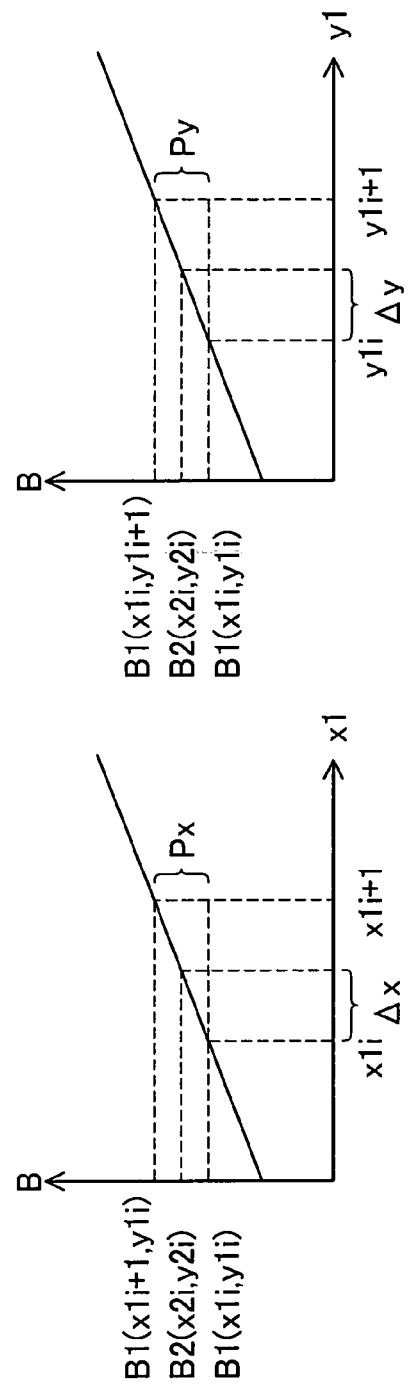

In this Embodiment, the amount of translational shift between the comparison reference image and a processing-object-image is calculated by the gradient-based method. FIGS. 6(a) and 6(b) illustrate a method for calculating translational shift by means of the gradient-based method. In FIG. 6(a), pixels and their luminance of a comparison reference image and of a processing-object-image are shown. In FIG. 6(a), (x1$i$, y1$i$) represents the coordinates of a pixel of the comparison reference image, and B1(x1$i$, y1$i$) represents the luminance of the coordinate. The general principle of the gradient-based method is illustrated in FIG. 6(b).

In the description here, it is assumed that the pixel of coordinates (x2$i$, y2$i$) of the processing-object-image is situated between pixels (x1$i$–x1$i$+1, y1$i$–y1$i$+1) of the comparison reference image, that is at inter-pixel coordinates (x1$i$+Δx, y1$i$+Δy).

As shown in FIG. 6(b), $$Px = B1(x1i+1, y1i) - B1(x1i, y1i) \quad (1)$$

$$Py = B1(x1i, y1i+1) - B1(x1i, y1i) \quad (2)$$

where $$B1 = B1(x1i, y1i) \quad (3)$$

$$B2 = B2(x1i, y1i) \quad (4)$$

The following relationships are true:

$$Px \cdot \Delta x = B2 - B1 \quad (5)$$

$$Py \cdot \Delta y = B2 - B1 \quad (6)$$

Therefore, Δx, Δy can be calculated so as to fulfill the expressions:

$$\{Px \cdot \Delta x - (B2-B1)\}^2 = 0 \quad (7)$$

$$\{Px \cdot \Delta y - (B2-B1)\}^2 = 0 \quad (8)$$

In actual practice, Δx, Δy are calculated for each pixel, and the average taken within the overall image.

Taking into consideration both the x direction and y direction, Δx, Δy are calculated to as to minimize the expression $$S^2 = \Sigma\{Px \cdot \Delta x + Py \cdot \Delta y - (B2-B1)\}^2 \quad (9).$$

While in this Embodiment the gradient-based method is used, other methods, such as a block matching or a repeated gradient-based method or a method which is a combination of these, may be used instead.

Figure 7:
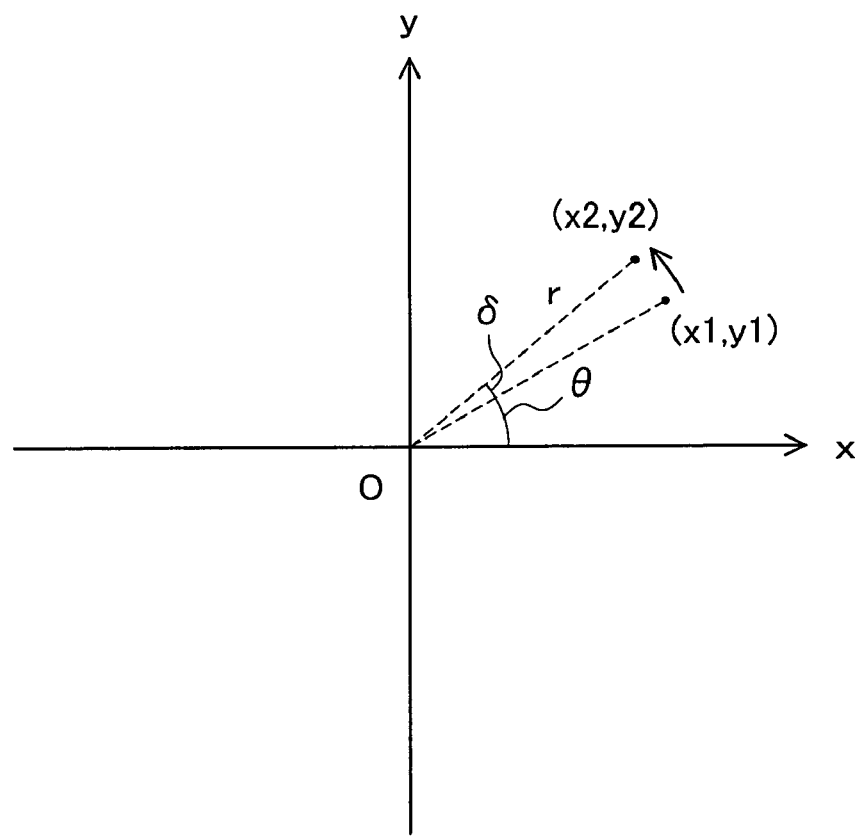
FIG. 7 is an illustration of a method for calculating rotational shift.

FIG. 7 is an illustration of a method for calculating rotational shift. Here, it is assumed that translational shift between the comparison reference image and processing-object-image has been compensated.

Where the distance of comparison reference image coordinates (x1, y1) from the origin O is denoted by r, and the rotation angle from the x axis is denoted by θ, r and θ are given by:

$$r = (x1^2 + y1^2)^{1/2} \quad (10)$$

$$\theta = \tan^{-1}(x1/y1) \quad (11).$$

Here, where rotation of comparison reference image coordinates (x1, y1) by an angle δ about the origin O aligns them with processing-object-image coordinates (x2, y2), distance in the x direction and y direction resulting from rotation is calculated by:

$$x2 - x1 \approx r \cdot \delta \cdot \sin \delta = -y1 \quad (12)$$

$$y2 - y1 \approx r \cdot \delta \cdot \cos \delta = -x1 \quad (13).$$

Accordingly, Δx, Δy in Eq. 9 above may be expressed as:

$$\Delta x = u - \delta \cdot y1 \quad (14)$$

$$\Delta y = v + \delta \cdot x1 \quad (15).$$

Substituting these into Eq. 9 gives $$S^2 = \Sigma\{Px \cdot (u - \delta y1) + Py \cdot (v + \delta \cdot x1) - (B2-B1)\}^2 \quad (16).$$

By using the least square algorithm to calculate values for u, v and δ that minimize $S^2$ in Eq. (16), it is possible to detect accurately translational shift and rotational shift between a comparison reference image and a processing-object-image with an error of less than one pixel. In Embodiment 1, since the time interval between frames is minimal, rotational shift and zoom are not taken into consideration. Since rotational shift is not taken into consideration, δ≈0, and thus by calculating values for u and v that minimize the expression $$S^2 = \Sigma\{Px \cdot u + Py \cdot v - (B2-B1)\}^2 \quad (17),$$

the amount of translational shift between a comparison reference image and a processing-object-image is detected, with an error of less than one pixel

A4: Still Image Generation Process

Figure 8:
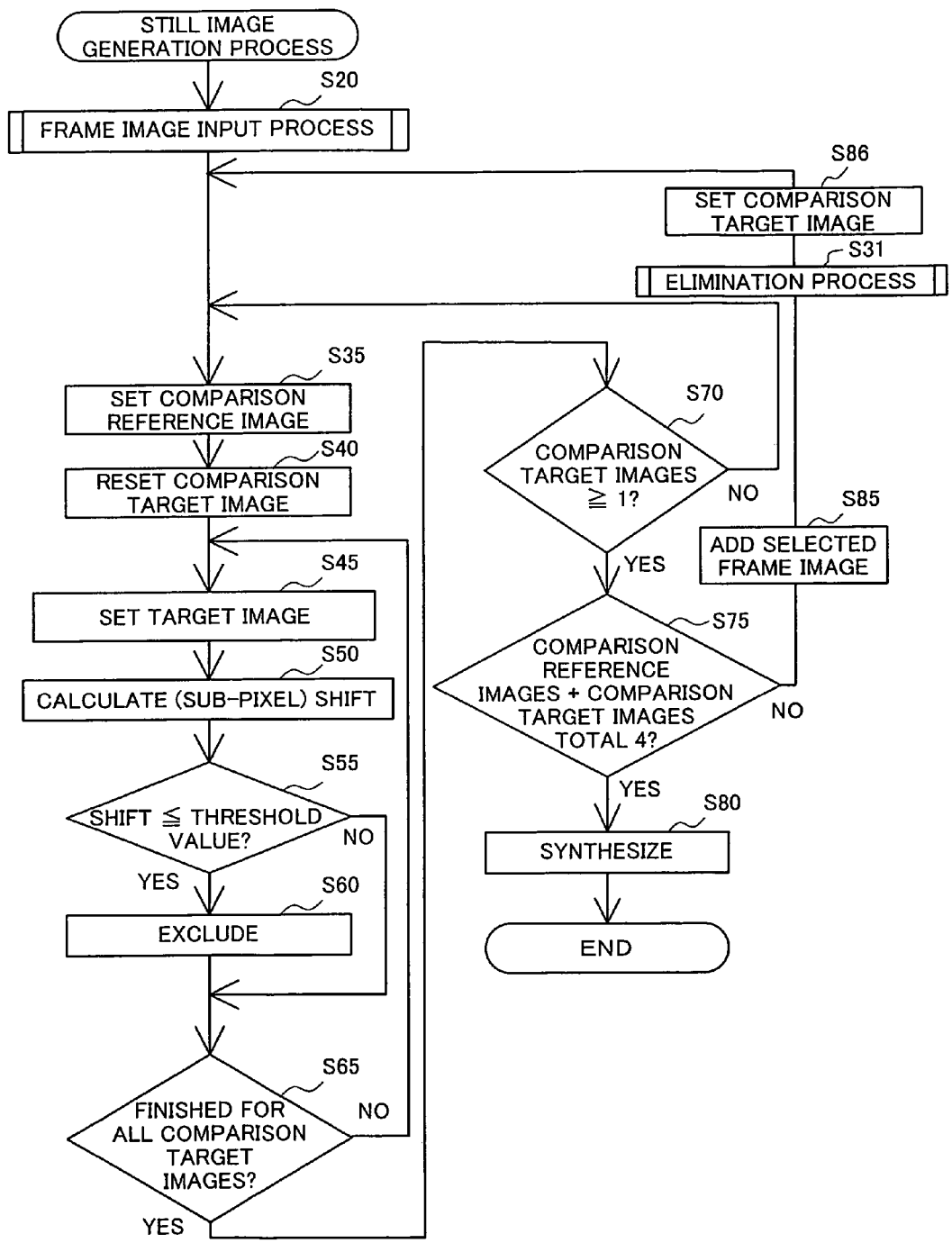
FIG. 8 is a flowchart showing the flow of a still image generating process in Embodiment 1.

FIG. 8 is a flowchart showing the flow of a still image generating process in Embodiment 1.

Figure 9:
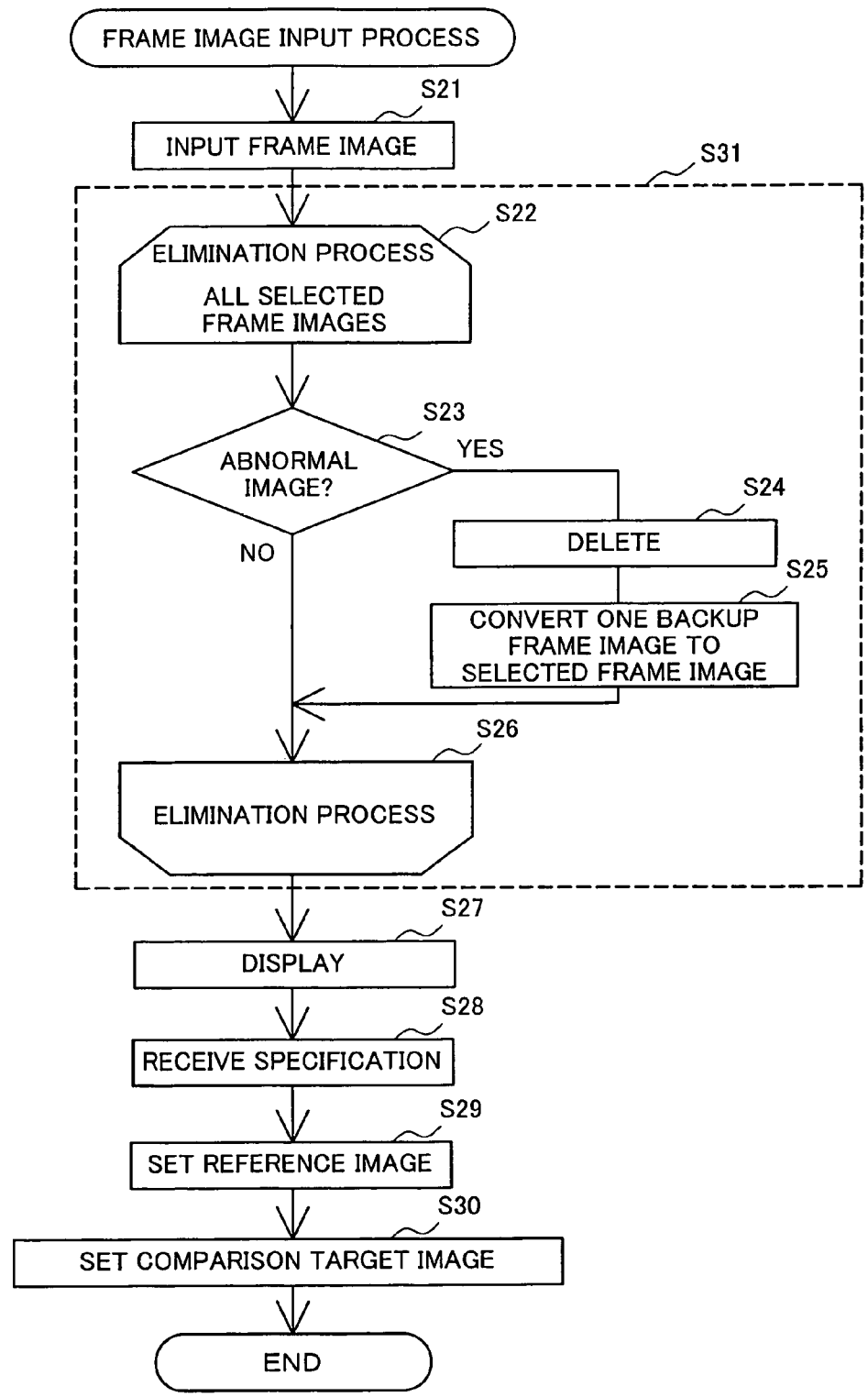
FIG. 9 is a flowchart showing a frame image input process.

First, the frame image input module 20 inputs or obtains a frame image (Step S20). FIG. 9 is a flowchart showing a frame image input process. The frame image input module 20 first inputs from the video image four selected frame images and twenty backup frame images, and stores these in the frame image storage module 30 (Step S21).

Next, the eliminating module 50 determines whether one frame among the selected frame images has an abnormality such as a high level of noise, being out-of-focus, abnormal color tone due to a hand covering the lens, or the like (Step S23). If there is an abnormality (Step S23), the selected frame image is eliminated from the frame-image storage module 30 (Step S24), and one backup frame image is converted to a selected frame image (Step S25). The routine of Step S23 to Step S25 is repeated unit it has been determined that all selected frame images are normal.

The reference image specification receiving module 25 displays all of the selected frame images on the monitor (Step S27), and receives specification of a reference image by the user (Step S28). Specification of a reference image is limited to one image. The reference image setting module 40 sets the one selected frame image specified by the user as the reference image (Step S29). The comparison target setting module 45 then sets the residual selected frame images other than the reference image as comparison target images (Step S30). This completes the description of the frame image input process; referring back to FIG. 8, the description now turns to the flow of the still image generating process.

Next, the reference image or one of the comparison target images is set as the comparison reference image (Step S35), and the residual comparison target images other than the comparison reference image are reset to comparison target images (Step S40). Then, one of the comparison target images is set as the processing-object-image, and the shift amount of the processing-object-image with respect to the comparison reference image is detected (Step S50).

Where (u, v) is the detected shift, the shift amount (Δu, Δv) is calculated as the absolute values of the difference between (u, v) and integers closest to (u, v). For example, where (u, v)=(2.3, 0.8), the integers closest to (u, v) are (2, 1), and thus the shift amount (Δu, Δv)=|(2, 1)−(2.3, 0.8)|=(0.3, 0.2).

Next, if the shift amount (Δu, Δv) is equal to or less than a threshold value (0.1, 0.1) (Step S55), the processing-object-image is deemed unsuitable for synthesis, and excluded from the comparison target images (Step S60). If detection of the shift amount from the comparison reference image has not been completed for all comparison target images (Step S65), the next comparison target image is set as the processing-object-image, and the routine from Step S45 to Step S60 is repeated.

Once the amount of shift from the comparison reference image has been detected for all comparison target images (Step S65), a decision is made as to whether the number of comparison target images is now one or fewer (Step S70). If not yet one or fewer, a new comparison target image is set as the new comparison reference image, and the routine from Step S35 to Step S65 is repeated.

If the number is one or fewer (Step S70), a decision is made as to whether the comparison reference images and comparison target images total four (Step S75). If they do not yet total four, backup frame images in a number corresponding to this deficit are converted to selected frame images (Step S85), and the elimination process is carried out for the newly added selected frame image (Step S31 in FIG. 9). The newly added selected frame image is then set as the comparison target image (Step S86). If they do total four, the comparison reference images and comparison target images are synthesized to create a synthesized image (Step S80).

According to the image generating device of Embodiment 1 described hereinabove, frame images having minimal shift with respect to a comparison reference image are excluded as targets for synthesis, and the number of frame images for synthesis is maintained at four, whereby picture quality of synthesized images can be improved efficiently.

B. Embodiment 2

B1. Arrangement of Image Generating Device

Figure 10:
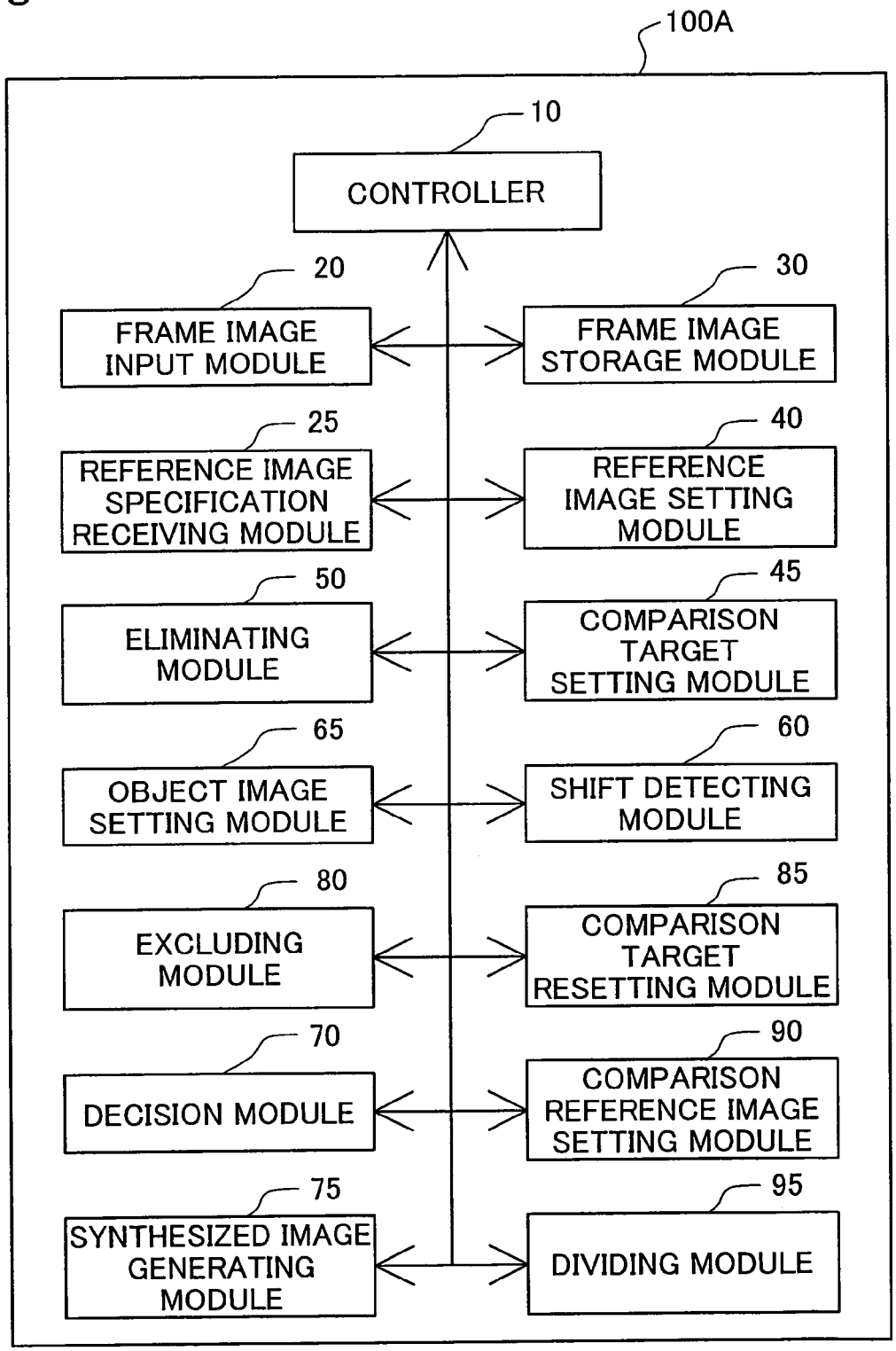
FIG. 10 is an illustration of a simplified arrangement of an image generating device 100A as Embodiment 2 of the invention.

FIG. 10 is an illustration of a simplified arrangement of an image generating device 100A as Embodiment 2 of the invention. Apart from being provided with a dividing module 95, the arrangement of image generating device 100A is substantially identical to that of the image generating device 100 of Embodiment 1. As will be explained below, in Embodiment 2, a processing-object-image is divided into a plurality of blocks, and shift amount with respect to a comparison reference image is calculated for each block. Blocks having only small shift with respect to the comparison reference image are excluded from targets for synthesis. Dividing module 95 divides all selected frame images into blocks of 16×16 pixels each.

B2. Detection of Block Shift

Figure 11:
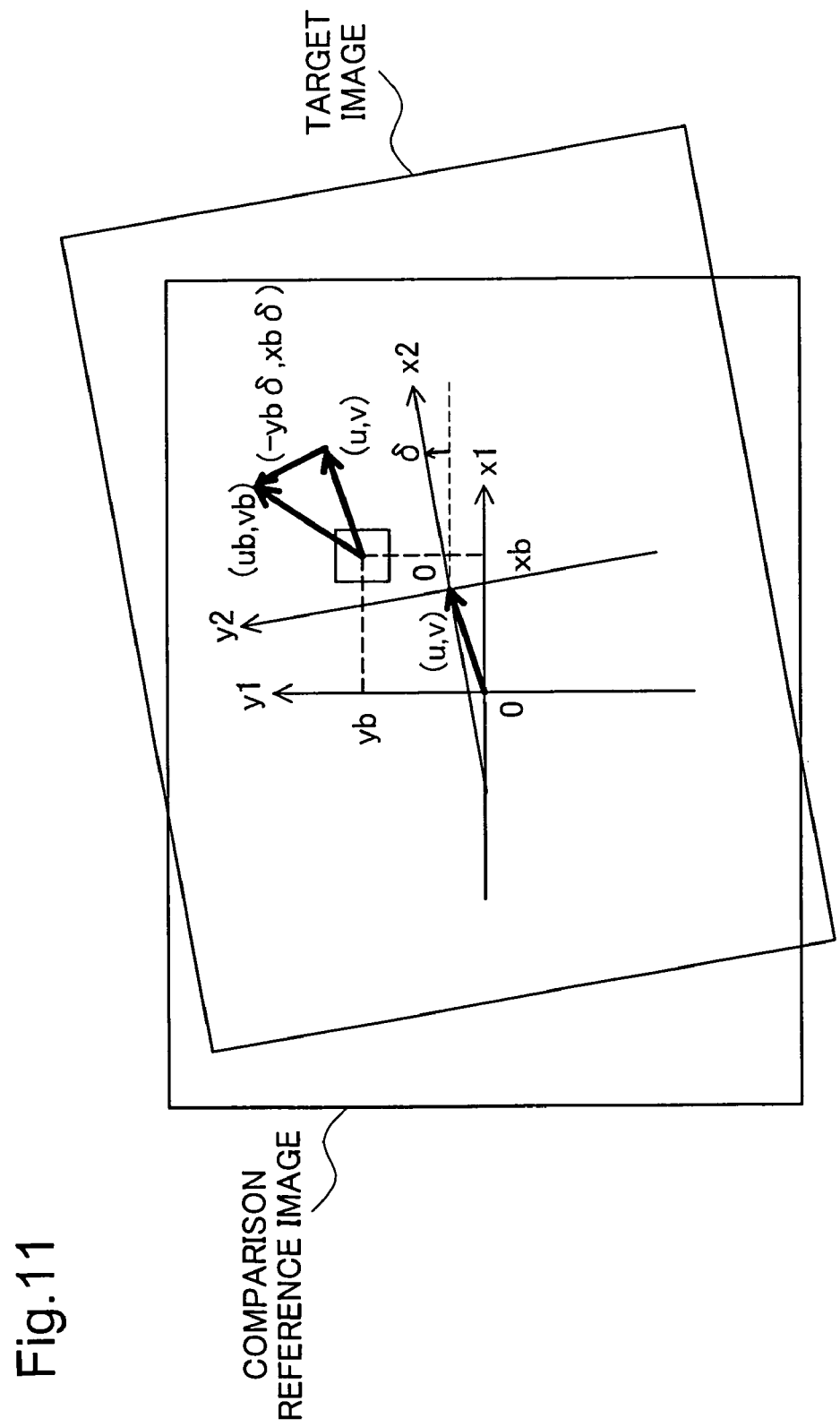
FIG. 11 is an illustration of a block shift amount between a comparison reference image and a processing-object-image.

FIG. 11 is an illustration of the amount of block shift between a comparison reference image and a processing-object-image. It is assumed that the comparison reference image coordinates (x1, y1) are shifted away from the processing-object-image coordinates (x2, y2). In Embodiment 2, shift amount of a frame image is composed of the three parameters of translational shift (u, v) and rotational shift δ.

Figure 12:
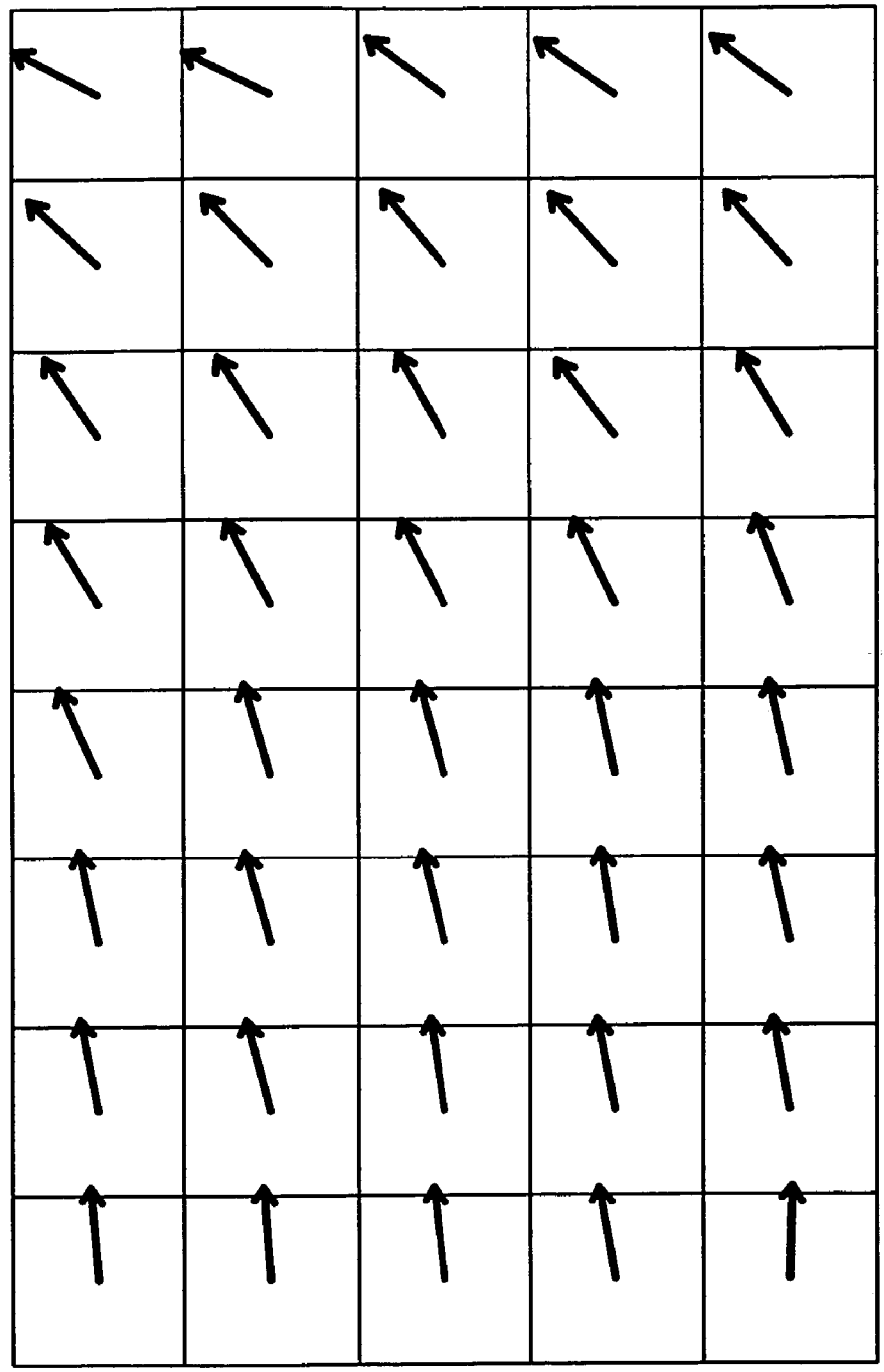
FIG. 12 is an illustration depicting a frame image divided into blocks.

FIG. 12 is an illustration depicting a frame image divided into blocks. The frame image in the drawing is divided into 5×8 blocks. Even where the frame image as a whole is rotated in the direction indicated by the arrows, the shift amount of individual blocks can be represented in terms of translational shift (u, v) only.

Specifically, the shift amount of a block centered on (xb, yb) in FIG. 11 is (ub, vb)=(u−yb·δ, v+xb·δ).

The shift amount of each block can be calculated from the translational shift and rotational shift of the frame image. Although in this embodiment the shift amount of each block is calculated from translational shift and rotational shift of a frame image, the shift amount of each block may instead be detected directly.

B3. Still Image Generation Process

Figure 13:
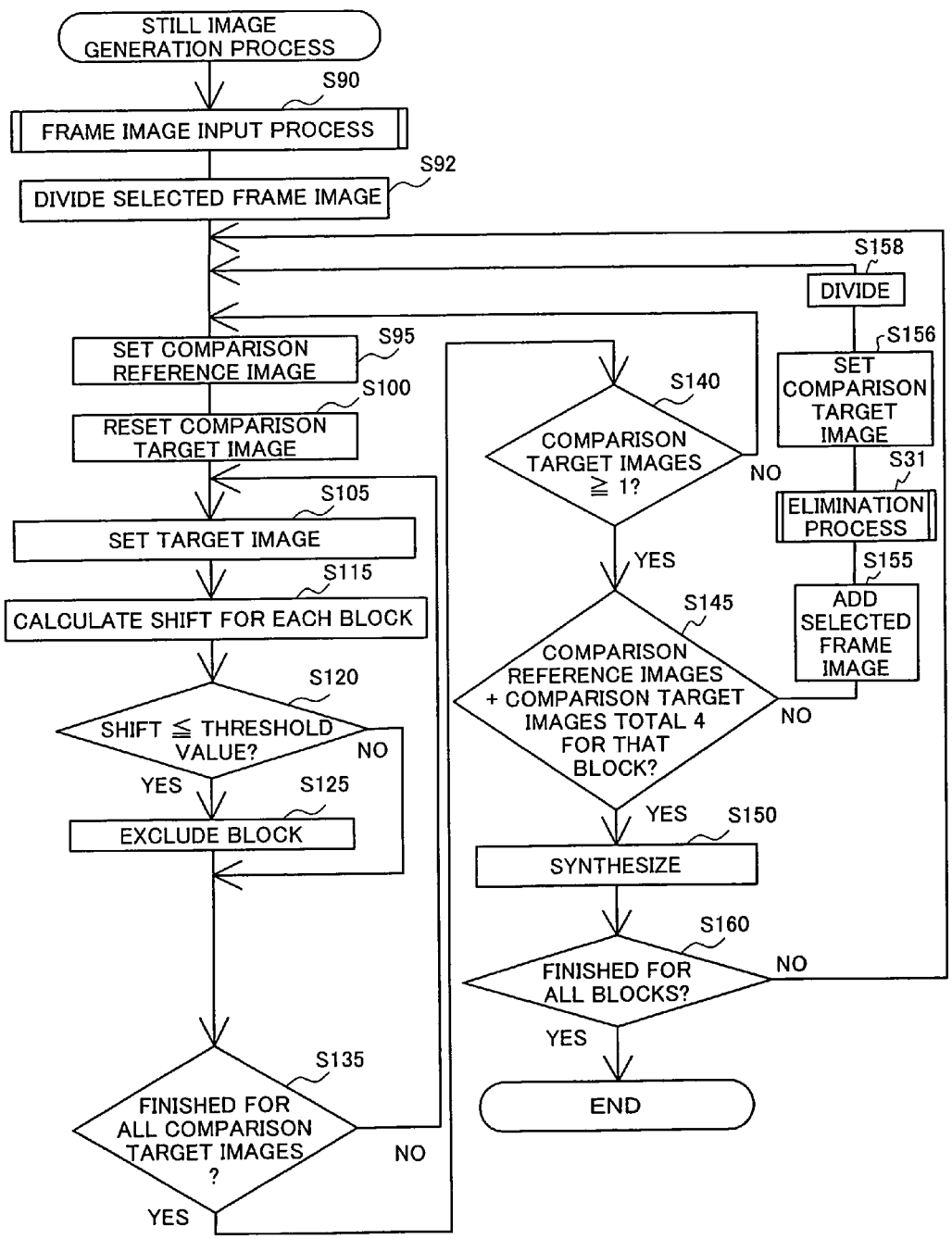
FIG. 13 is a flowchart showing the flow of a still image generating process in Embodiment 2.

FIG. 13 is a flowchart showing the flow of a still image generating process in Embodiment 2. The process is executed by the CPU of image generating device 100A.

In Embodiment 2, all selected frame images are divided into blocks of 16×16 pixels each (Step S92). A process similar to that of Embodiment 1 is then performed on each block (Step S95-Step S150). That is, processing is carried out on each block treated as if it were an independent frame image. At this time, processing is carried out on blocks at identical locations within selected frame images (block 1 of selected frame image 1, block 1 of selected frame image 2, block 1 of selected frame image 3, block 1 of selected frame image 4). The process of Step S95-Step S150 is repeated in the same manner for blocks 2, blocks 3 . . . for all blocks (Step S155).

Once a backup frame image has been converted to a selected frame image (Step S155), subjected to the elimination process (Step S30), and the selected frame image set as the comparison target image (Step S156), the comparison target image is divided into blocks of 16×16 pixels each (Step S158).

According to the image generating device 100A of Embodiment 2 described hereinabove, shift amount of blocks can be calculated easily on the basis of the shift amount of frame images. Dividing a frame image into blocks allows even a frame image that taken as a whole cannot be used in synthesis to now be used in synthesis.

C. Variations

While the invention has been described hereinabove in terms of a number of embodiments, the invention is not limited to the embodiments herein, and could be reduced to practice in various ways without departing from the scope and spirit thereof. For example, various settings are possible for the number of frame images to be synthesized, or the threshold value for shift. Additionally, the criterion for deciding whether a processing-object-image will be used in synthesis may instead be a image difference that is a summation of differences in pixel characteristic values at identical locations in a comparison reference image and a processing-object-image, or a difference in average pixel characteristic values. Variations such as the following are also possible.

Figure 14:
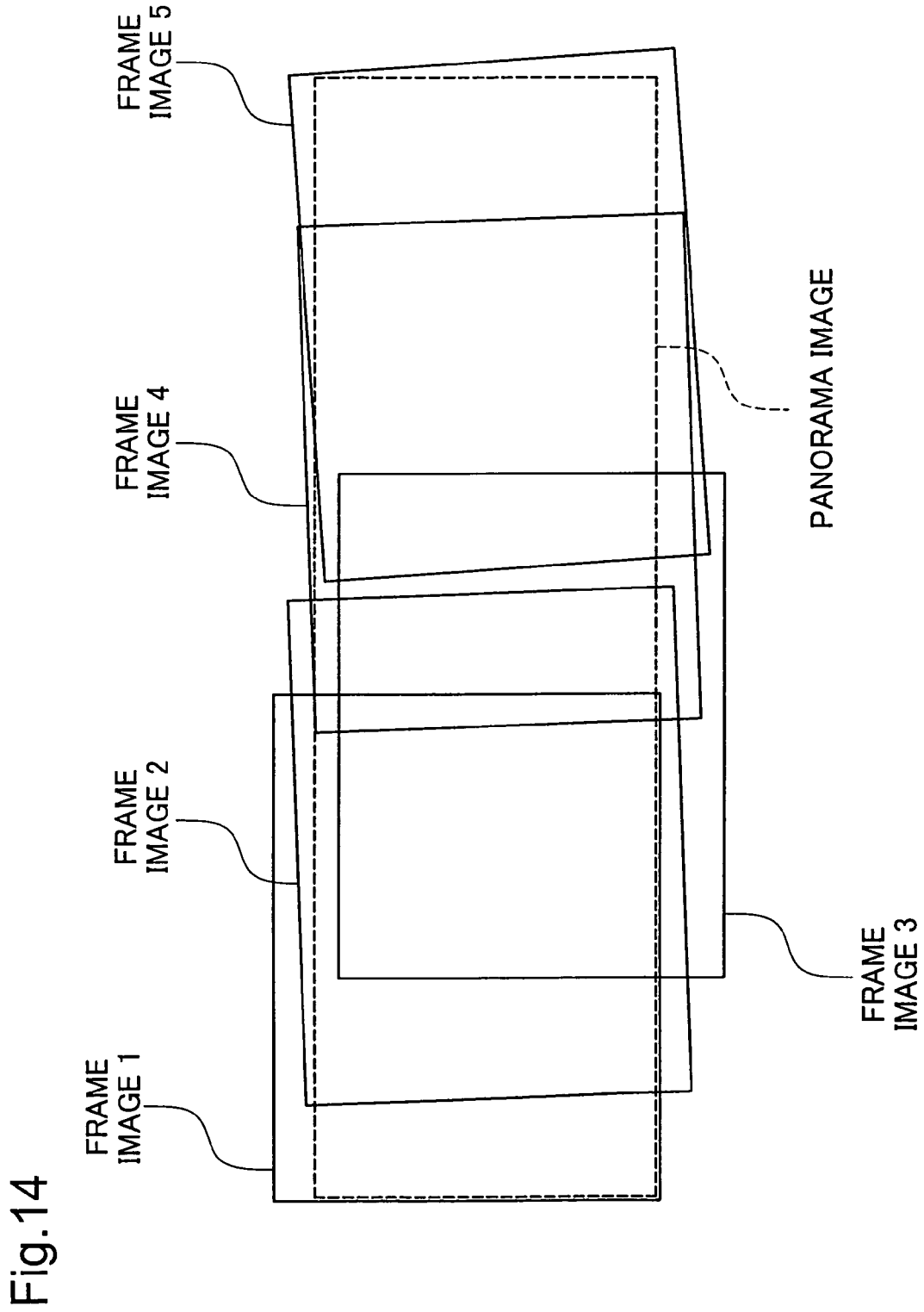
FIG. 14 is an illustration depicting generation of a panorama image.

The image generating device 100 of Embodiment 1 can also generate panorama images. FIG. 14 is an illustration depicting generation of a panorama image. Here, there is shown an instance in which the five frame images 1-5 shown by solid lines are synthesized so that a part thereof is extracted to generate a panorama image shown by broken lines. With the prior art image generating device described earlier, where frame image 1 is made the reference image, generation of a synthesized image was not possible since there is no area of overlap with frame image 5. With the image generating device 100 of Embodiment 1, however, by switching the comparison reference image in the order frame image 1→frame image 2→frame image 3→frame image 4, it becomes possible to synthesize more frame images to generate a panorama image.

INDUSTRIAL APPLICABILITY

The invention is applicable to devices that synthesize a plurality of frame images of video or still images.

I claim:

1. An image generating device for generating a still image from a plurality of frame images contained in a video sequence, the device comprising:
    a synthesis object setting module for setting, from among areas included in frame images other than a reference frame image selected from among the plurality of frame images, one or more areas as object frame image areas for synthesis, the object frame image areas being selected according to a predetermined rule relating to a reference frame image area within the reference frame image;
    a comparison reference extracting module for extracting one comparison reference frame image area from among the reference frame image area and the object frame image areas for synthesis;
    a target extracting module for extracting one target frame image area from among the object frame image areas for synthesis other than the comparison reference frame image area;
    a comparing module for comparing the comparison reference frame image area with the target frame image area to calculate a relative image shift amount between the comparison reference frame image area and the target frame image area, the calculating of the relative image shift amount including detecting a shift (u, v) of the target frame image area with respect to the comparison reference frame image area, and calculating a local shift amount (Δu, Δv) as absolute values of a difference between (u, v) and integers closest to (u, v);
    an excluding module for excluding the target frame image area from the object frame image areas for synthesis if the relative image shift amount is less than a predetermined value; and
    a synthesized image generating module for synthesizing the reference frame image area and the object frame image areas for synthesis to create a synthesized image area of a still image that has a higher resolution than the frame images,
    wherein each module in the image generating device is executed by an integrated circuit.

2. An image generating device according to claim 1, further comprising:
    a setting module for setting as the reference frame image area an area within the reference frame image, to serve as a reference for synthesis; and
    a frame number controlling module for repeating processes of the synthesis object setting module, the comparison reference extracting module, the object extracting module, the comparing module, and the excluding module, until the total number of the reference frame image area and the object frame image areas for synthesis reaches a predetermined number.

3. An image generating device according to claim 2, further comprising
    a specification receiving module for receiving specification of the reference frame image,
    wherein the setting module sets the specified frame image as the reference frame image.

4. An image generating device according to claim 1, wherein
    the comparison reference extracting module sets the reference frame image area as the comparison reference frame image area.

5. An image generating device according to claim 1, further comprising
    an eliminating module for eliminating, from among the object frame image areas for synthesis, an area of frame image for which a characteristic of the frame image area meets a predetermined condition.

6. An image generating device according to claim 1, wherein the comparing module comprises:
    a frame shift calculating module for calculating the image shift amount of a target frame image containing the target frame image area, with respect to a comparison reference frame image containing the comparison reference frame image area; and
    an area shift calculating module for calculating the image shift amount of the target frame image area with respect to the comparison reference frame image area, based on the image shift amount calculated by the frame shift calculating module.

7. An image generating device according to claim 1, wherein the reference frame image area and the object frame image area for synthesis are areas derived by dividing each frame image in an identical manner; and
    the target extracting module extracts a target frame image area at a same location corresponding to the comparison reference frame image area.

8. An image generating device for generating a still image from a plurality of frame images contained in a video sequence, wherein if a relative image shift amount calculated by comparing a reference frame image area which is an area serving as a reference for synthesis and contained in a reference frame image which is one of the plurality of frame images, with a comparison target frame image area which is one of areas contained in the plurality of frame images, is less than a predetermined value, the image generating device excludes the comparison target frame image area from the synthesis of the still image, and wherein the calculating of the relative image shift amount includes detecting a shift (u, v) of the target frame image area with respect to the comparison reference frame image area, and calculating a local shift amount (Δu, Δv) as absolute values of a difference between (u, v) and integers closest to (u, v).

9. An image generating method for generating a still image from a plurality of frame images contained in a video sequence, the method comprising the steps of:
   (a) setting, from among areas included in frame images other than a reference frame image selected from among the plurality of frame images, one or more areas as object frame image areas for synthesis, the object frame image areas being selected according to a predetermined rule relating to a reference frame image area within the reference frame image;
   (b) extracting one comparison reference frame image area from among the reference frame image area and the object frame image areas for synthesis;
   (c) extracting one target frame image area from among the object frame image areas for synthesis other than the comparison reference frame image area;
   (d) comparing the comparison reference frame image area with the target frame image area to calculate a relative image shift amount between the comparison reference frame image area and the target frame image area, the calculating of the relative image shift amount including detecting a shift (u, v) of the target frame image area with respect to the comparison reference frame image area, and calculating a local shift amount (Δu, Δv) as absolute values of a difference between (u, v) and integers closest to (u, v);
   (e) excluding the target frame image area from the object frame image areas for synthesis if the relative image shift amount is less than a predetermined value; and
   (f) synthesizing the reference frame image area and the object frame image areas for synthesis to create a synthesized image area of a still image that has a higher resolution than the frame images.

10. An image generating method according to claim 9, further comprising the steps of:
   setting as the reference frame image area an area within the reference frame image, to serve as a reference for synthesis; and
   (g) repeating processes of the step (a), the step (b), the step (c), the step (d), and the step (e) until the total number of the reference frame image area and the object frame image areas for synthesis reaches a predetermined number.

11. An image generating method according to claim 10, further comprising the step of:
   receiving specification of the reference frame image, wherein the step of setting the reference frame image area includes the step of setting the specified frame image as the reference frame image.

12. An image generating method according to claim 9, wherein the step (b) includes the step of setting the reference frame image area as the comparison reference frame image area.

13. An image generating method according to claim 9, further comprising the step of:
   eliminating, from among the object frame image areas for synthesis, an area of frame image for which a characteristic of the frame image area meets a predetermined condition.

14. An image generating method according to claim 9, wherein the step (d) comprises the steps of:
   calculating the image shift amount of a target frame image containing the target frame image area, with respect to a comparison reference frame image containing the comparison reference frame image area; and
   calculating the image shift amount of the target frame image area with respect to the comparison reference frame image area, based on the image shift amount.

15. An image generating method according to claim 9, wherein the reference frame image area and the object frame image area for synthesis are areas derived by dividing each frame image in an identical manner; and the step (c) includes the step of extracting a target frame image area at a same location corresponding to the comparison reference frame image area.

16. An image generating method for generating a still image from a plurality of frame images contained in a video sequence, wherein if a relative image shift amount calculated by comparing a reference frame image area which is an area serving as a reference for synthesis and contained in a reference frame image which is one of the plurality of frame images, with a comparison target frame image area which is one of areas contained in the plurality of frame images, is less than a predetermined value, the method excludes the comparison target frame image area from the synthesis of the still image, and wherein the calculating of the relative image shift amount includes detecting a shift (u, v) of the target frame image area with respect to the comparison reference frame image area, and calculating a local shift amount (Δu, Δv) as absolute values of a difference between (u, v) and integers closest to (u, v).

17. A computer program stored on a computer readable medium for generating a still image from a plurality of frame images contained in a video sequence, the computer program comprising:
   a synthesis object setting program for causing a computer to set, from among areas included in frame images other than a reference frame image selected from among the plurality of frame images, one or more areas as object frame image areas for synthesis, the object frame image areas being selected according to a predetermined rule relating to a reference frame image area within the reference frame image;
   a comparison reference extracting program for causing the computer to extract one comparison reference frame image area from among the reference frame image area and the object frame image areas for synthesis;
   a target extracting program for causing the computer to extract one target frame image area from among the object frame image areas for synthesis other than the comparison reference frame image area;
   a comparing program for causing the computer to compare the comparison reference frame image area with the target frame image area to calculate a relative image shift amount between the comparison reference frame image area and the target frame image area the calculating of the relative image shift amount including detecting a shift (u, v) of the target frame image area with respect to the comparison reference frame image area, and calculating a local shift amount (Δu, Δv) as absolute values of a difference between (u, v) and integers closest to (u, v);

an excluding program for causing the computer to exclude the target frame image area from the object frame image areas for synthesis if the relative image shift amount is less than a predetermined value; and a synthesized image generating program for causing the computer to synthesize the reference frame image area and the object frame image areas for synthesis to create a synthesized image area of a still image that has a higher resolution than the frame images.

18. A computer program stored on a computer readable medium for generating a still image from a plurality of frame images contained in a video sequence, the computer program causing a computer to execute a process wherein if a relative image shift amount calculated by comparing a reference frame image area which is an area serving as a reference for synthesis and contained in a reference frame image which is one of the plurality of frame images, with a comparison target frame image area which is one of areas contained in the plurality of frame images, is less than a predetermined value, the process excludes the comparison target frame image area from the synthesis of the still image, and wherein the calculating of the relative image shift amount includes detecting a shift (u, v) of the target frame image area with respect to the comparison reference frame image area, and calculating a local shift amount (Δu, Δv) as absolute values of a difference between (u, v) and integers closest to (u, v).

* * * * *